April 27, 1948.     E. JOST     2,440,586
SHEAR HEAD FOR ELECTRIC DRY SHAVERS
Filed Feb. 24, 1945
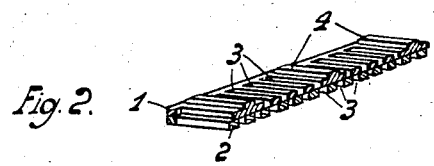
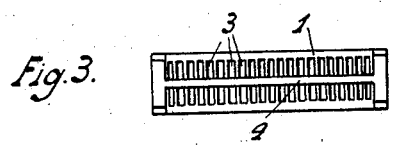
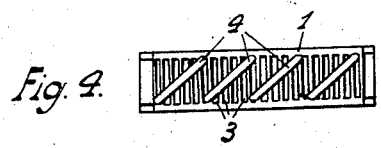
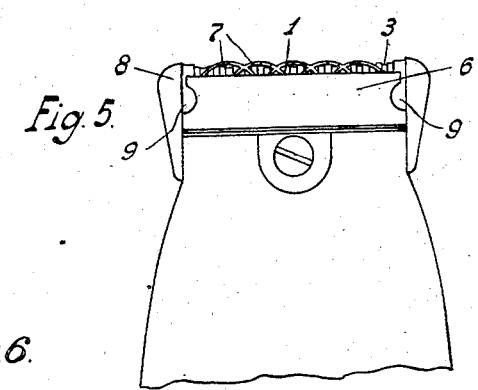
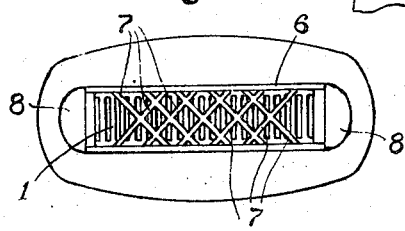
Inventor
E Jost
By Glascox & Downing Diehl
attys Patented Apr. 27, 1948

2,440,586

UNITED STATES PATENT OFFICE 2,440,586

SHEAR HEAD FOR ELECTRIC DRY SHAVERS

Emil Jost, Zurich, Switzerland

Application February 24, 1945, Serial No. 579,527
In Switzerland May 18, 1942

Section 1, Public Law 690, August 8, 1946
Patent expires May 18, 1962

2 Claims. (Cl. 30—43)

The present invention relates to a shear head for electric dry shavers in which a movable inner shearing cutter or blade is mounted underneath and registering with a stationary slotted and adjacent cooperating outer shearing cutter or blade, which for shaving is moved back and forth on the skin whereby the hairs enter the shearing cavities on the shearing cutter and are cut off. The outer shearing cutter may thereby have a bent or broken outline i. e. it may be cylinder-shaped or in the form of a disk or of a plate.

In the known embodiments of said shear heads the outer surface is fine polished to allow the shear head an easy movement on the skin. However this causes the inconvenience that it is almost impossible to cut single hairs which have been bent down for any reason against the skin.

The principal object of the present invention is to eliminate said inconvenience and to assure the raising and cutting off of said single hairs.

Thus according to the invention the new shear head eliminates said inconveniences since the surface of the stationary shearing cutter is provided with at least one low projection.

The nature of the invention will be readily understood from the following description when read in connection with the accompanying drawing and the novel feature will be particularly pointed out in the appended claims. In the drawing, Fig. 1 is a partial sectional view of a shear head in an enlarged scale.

Fig. 2 is a perspective view of the shear head-portion shown in Fig. 1.

Figs. 3 and 4 are diagrammatical top-views of shear heads,

Fig. 5 is a side elevation of the upper portion of a dry shaver together with its shear head built up in accordance with the invention.

Fig. 6 is a top-view of the device of Fig. 5.

The parts of a shear head shown diagrammatically in Figs. 1 and 2 comprise a stationary cutter-part 1 and a movable cutter-part 2 sliding along the first cutter-part 1.

Both of these cutter-parts 1 and 2 are provided with slots 3 extending crosswise to the direction of travel of the movable cutter-part 2.

The stationary cutter-part 1 being adapted to move over the skin is provided with ribs 4 which serve to raise up hairs to be cut.

Instead of the ribs there may be arranged any projections on the outer face of the stationary cutter-part 1 crossing the slots at right angles (Fig. 3) or obliquely (Fig. 4).

The machined ribs or strips may be e. g. welded or soldered to said stationary outer cutter 1. Ribs or any kind of projections may be punched or pressed or in any way machined into said outer shearing cutter 1 i. e. they may constitute one body with the latter. The ribs or projections may be substantially larger spaced with reference to the slots so as to produce the desired effect.

It would also be possible to form some higher ribs among the ribs and slots of the outer shearing cutter 1 to provide the desired projections at the surface of said part. This is easily realisable by e. g. grinding crossed or obliquely positioned grooves into the stationary cutter, which might preferably be as large as several ribs and whose height is less than the height of the other ribs. The ground off grooves might have rounded edges on both sides.

Instead of being flat as shown in the Figs. 1 and 2 the parts 1 and 2 may form a part of a cylinder on which the slots extend in planes at right angles to the axis of the cylinder or obliquely. In the place of slots there may be provided perforations of any kind and shape as may be found on shear heads on the market.

As shown in Fig. 5 of the drawing such shear heads are affixed to a casing containing an electric motor for driving the movable inner cutter 2 sliding along the outer cutting part 1, the two parts being provided with slots of any kind.

In a frame 6 which can be mounted on the shear head, filaments 7 are provided which project above the surface of the stationary outer shearing cutter-part 1. The frame 6 is provided with a waste hair container 8 and notches 9 by which frame 6 can be releasably mounted on the shear head. The filaments 7 provide projections on the polished outer surface of part 1 which draw up the bent-down hairs so that they may enter directly into the slots and be cut off. In the drawing, the filaments 7 cross each other on the upper side of the stationary shearing cutter 1, but the filaments may be arranged all in the same direction, parallel to each other respectively.

I claim:

1. A shear head for electric dry shavers in which a stationary perforated shearing cutter-part cooperates with a perforated movable shearing cutter-part located underneath the first shearing cutter-part, the outer surface of the stationary shearing cutter-part being provided with an arrangement of low projections in which the low projections extend in an oblique direction relative to the shear head axis.

2. A shear head for electric dry shavers in which a stationary perforated shearing cutter-part cooperates with a perforated movable shearing cutter-part located underneath the first shearing cutter-part, the outer surface of the stationary shearing cutter-part being provided with an arrangement of low projections which extend in oblique directions relative to the shear head axis in which the low projections are formed by ribs, crossing each other.

EMIL JOST.

REFERENCES CITED

The following references are of record in the file of this patent:

UNITED STATES PATENTS

| Number | Name | Date |
|---|---|---|
| 2,223,156 | Benner | Nov. 26, 1940 |
| 2,280,363 | Andis | Apr. 21, 1942 |
| 2,336,638 | Rand | Dec. 14, 1943 |
| 2,346,235 | Romao | Apr. 11, 1944 |